United States Patent Office 3,412,078
Patented Nov. 19, 1968

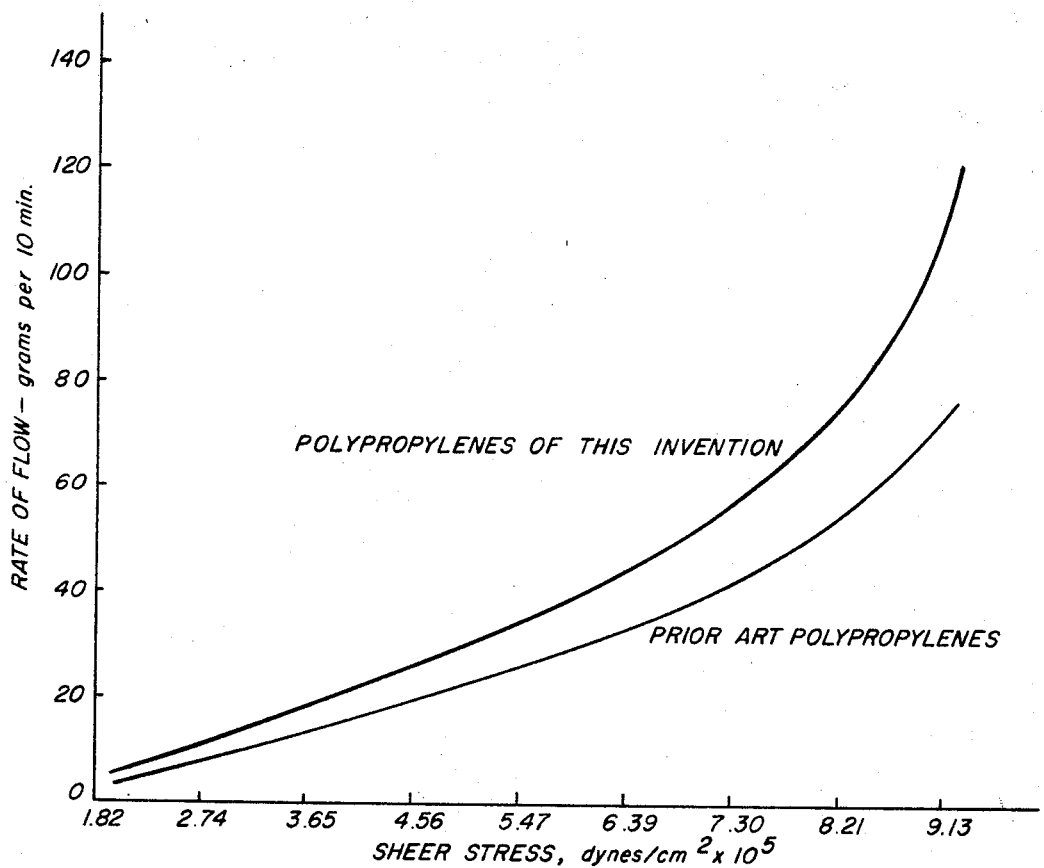

3,412,078
POLYPROPYLENE HAVING A HIGH DEGREE
OF UNSATURATION
Hugh J. Hagemeyer, Jr., and Marvin B. Edwards, Longview, Tex., assignors to Eastman Kodak Company, Rochester, N.Y., a corporation of New Jersey
Continuation-in-part of application Ser. No. 210,835, July 18, 1962. This application Feb. 16, 1966, Ser. No. 527,851
8 Claims. (Cl. 260—93.7)

ABSTRACT OF THE DISCLOSURE

Polypropylene having a high degree of unsaturation which has outstanding film-forming and flow properties.

This application is a continuation-in-part of application S.N. 210,835, filed July 18, 1962, now abandoned, which is a continuation-in-part of application S.N. 756,522, filed Aug. 22, 1958, now abandoned, which is a continuation-in-part of application S.N. 555,228, filed Dec. 27, 1955, now abandoned. This application is also a continuation-part of application S.N. 230,702, filed Oct. 15, 1962, now abandoned, which is a continuation-in-part of application S.N. 152,001, filed Nov. 13, 1961, now abandoned.

This invention relates to a new polymer prepared from propylene. In a specific aspect this invention relates to a new polypropylene that has outstanding film-forming and flow properties.

Heretofore propylene has been polymerized in the presence of a wide variety of catalysts in an effort to prepare a polymer that is as nearly stereoregular as possible. Stereospecific catalysts have been prepared and used for this purpose and the object has been to produce a propylene polymer that is highly crystalline, insoluble in boiling n-heptane, and having a stereoregular structure. Metal oxide catalysts and coordination type catalysts containing a transition metal halide have been used for this purpose. Illustrations of the types of propylene polymers that have been prepared in this manner can be found in British Patent 810,023 and U.S. Patents 3,112,300 and 3,112,301. These patents describe the preparation of a so-called isotactic polypropylene in which all of the asymmetric carbon atoms have the same steric configuration. Attempts have been made to increase the stereoregularity of polypropylene on the theory that a more regular structure would improve the properties of the polymer. These efforts have achieved some success in that it has been possible to realize improvements in the stiffness and tensile strength of the polymer as a result of greater stereoregularity. On the other hand, for some applications of these prior art types of polypropylene its use has been rather seriously restricted. For example, highly stereoregular polypropylene has only a rather limited use as a film because of the poor quality of the film such as its poor gloss, haze, transparency and impact strength and the high embrittlement of the film after ageing. Highly stereoregular polypropylene also has relatively poor flow properties, and as a consequence, it has not been possible for this type of polypropylene to achieve its fullest commercial utilization.

It is an object of this invention to provide a new and improved propylene polymer having a structure different from previously known propylene polymers. It is another object of this invention to provide a new and improved propylene polymer having outstanding film-forming and flow properties. It is a further object of this invention to provide a new and improved propylene polymer that is characterized by a higher degree of unsaturation in the polymer chain than the prior art types of propylene polymer. It is still a further object of this invention to provide a propylene polymer having outstanding film-forming and flow properties as well as the advantageous properties of highly stereoregular propylene polymers such as high stiffness, high tensile strength, and high softening point. Other objects of this invention will be apparent from the detailed description that follows.

In accordance with this invention we have found that a new propylene polymer can be produced having substantial crystallinity and being insoluble in boiling hexane and having a total weight percent vinyl and vinylidene unsaturation between 0.04 and 0.27 with 0.025 to 0.065 weight percent of said unsaturation being vinyl unsaturation. As a consequence of the high percentage of unsaturation in the polymer chain of our polypropylene, we have found that we can overcome some of the deficiencies of prior art types of polypropylene by greatly improved film and flow properties. Our new polypropylene is highly crystalline and it is insoluble in boiling hexane. Our polypropylene possesses the desirable properties of the highly stereoregular types of polypropylene prepared prior to our invention, and at the same time our polypropylene has greatly improved film and flow properties when compared with the prior art types of polypropylene.

The polypropylene of our invention is produced by a solution process at temperatures sufficiently high that during the reaction the polypropylene is dissolved in the reaction solvent or diluent. Our specific examples illustrate that the polymerization reaction is carried out at carefully selected conditions of temperature and pressure and in the presence of a lithium-type of catalyst in combination with a reduced transition metal halide. The preferred catalyst contains either lithium aluminum hydride or lithium aluminum heptahydride with a reduced titanium halide such as titanium trichloride. For best results an alkali metal halide such as sodium fluoride is employed in the catalyst. The polymerization reaction is carried out by contacting the propylene with a suitable lithium-type catalyst in a liquid hydrocarbon solvent at a temperature of at least 150° C. and usually not above 250° C. After the desired molecular weight of the polymer has been achieved as measured by the inherent viscosity, the polypropylene is separated from catalyst by filtration or other suitable means and the hydrocarbon solvent is then stripped from the polymer. The lithium:titanium ratio in the catalyst is varied within the range of 2:1 to 1:2 and the amount of sodium fluoride is sufficient to increase substantially the stereospecificity of the catalyst. Aliphatic or aromatic hydrocarbon solvents may be used in the polymerization reaction. A preferred solvent is a mineral spirits fraction having a boiling point of 180 to 200° C. The polymerization reaction is carried out either batchwise or continuously at at pressure varying from atmospheric to 200 atmos. The preferred polymerization pressure is about 1000 p.s.i.

The propylene polymer that is produced in the manner described above is initially a mixture of amorphous and highly crystalline polypropylene which can be separated by extraction. The total or gross polymer can be used to form useful articles by injection molding, extruding, and the like. The gross polymer contains greater than 70% by weight of crystalline polymer and has many uses. It is desirable to extract at least a portion of the amorphous polymer from the gross polymer. The extraction can be accomplished with hexane at or near its boiling point, and any amount of the amorphous polymer can be separated from the crystalline polymer in this manner. The crystalline polymer is insoluble in boiling hexane, and it has a total weight precent vinyl and vinylidene unsaturation between 0.04 and 0.27 with 0.025 to 0.065 weight percent of said unsaturation being vinyl unsaturation.

The propylene polymers within the scope of this invention are characterized by a high degree of unsaturation which is made up of both vinyl and vinylidene unsaturation as measured by infrared techniques. Table I demonstrates the total percent unsaturation of propylene polymers of this invention, and this total unsaturation is compared with the total unsaturation in known types of polypropylene that have been available commercially.

TABLE I

|  | Inherent Viscosity | Percent Vinyl Unsaturation | Percent Vinylidene Unsaturation | Percent Total Unsaturation |
| --- | --- | --- | --- | --- |
| POLYPROPYLENES OF THIS INVENTION | | | | |
| Sample 1 | 0.95 | 0.044 | 0.035 | 0.079 |
| Sample 2 | 1.20 | 0.050 | 0.030 | 0.080 |
| Sample 3 | 1.40 | 0.042 | 0.029 | 0.071 |
| Sample 4 | 1.55 | 0.030 | 0.028 | 0.058 |
| Sample 5 | 1.75 | 0.029 | 0.026 | 0.055 |
| PRIOR ART POLYPROPYLENE | | | | |
| Sample 6 | 1.20 | 0.004 | 0.005 | 0.009 |
| Sample 7 | 1.43 | 0.004 | 0.003 | 0.007 |
| Sample 8 | 1.56 | 0.012 | 0.010 | 0.022 |
| Sample 9 | 1.65 | 0.003 | 0.003 | 0.006 |
| Sample 10 | 1.50 | 0.003 | 0.006 | 0.009 |
| Sample 11 | 2.65 | 0.001 | 0.007 | 0.008 |
| Sample 12 | 1.57 | 0.005 | 0.003 | 0.008 |

It is apparent that the high percentage total unsaturation and especially the high vinyl saturation is found only in the propylene polymers of this invention, and not in the propylene polymers that were available prior to this invention. Although the total unsaturation of the prior art propylene polymers can be increased by thermal degradation of the polymer, the increase in unsaturation that results from thermal degradation is in the vinylidene unsaturation with the vinyl unsaturation remaining essentially unchanged. For example, a sample of prior art polypropylene having a relatively low total unsaturation and having an I.V of 1.8 was thermally degraded at a temperature of 230° C. for 46 hrs. to form a product having an I.V. of 1.2. The unsaturation of the polymer was measured before and after thermal degradation, and the following results were observed.

|  | Percent Vinyl Unsaturation | Percent Vinylidene Unsaturation | Percent Total Unsaturation |
| --- | --- | --- | --- |
| Before degradation | 0.005 | 0.003 | 0.008 |
| After degradation | 0.005 | 0.048 | 0.053 |

It should be observed that the total unsaturation of the gross or total polymer mixture of this invention is higher than the total unsaturation of the crystalline hexane insoluble polypropylene within the scope of this invention. This difference in unsaturation is shown by the following table which includes the unsaturation of the gross polymer mixture and the hexane insoluble fraction of that mixture.

|  | Percent Vinyl Unsaturation | Percent Vinylidene Unsaturation | Percent Total Unsaturation |
| --- | --- | --- | --- |
| Total polymer mixture | 0.051 | 0.055 | 0.106 |
| Hexane-insoluble polypropylene | 0.041 | 0.035 | 0.076 |

It is one of the outstanding features of this invention that our polypropylene has exceptional film-forming properties and these properties are unexpectedly superior to the prior art types of polypropylene. These improved film properties are the result of the higher unsaturation in our polymers. The following table contains a comparison of the typical film characteristics of a polypropylene of our invention, and the typical film characteristics of a prior art type of polypropylene.

|  | Polypropylene of This Invention | Prior Art Polypropylene |
| --- | --- | --- |
| Thickness, mils | 1.0 | 1.0 |
| Gloss | 90 | 79 |
| Haze | <0.5 | 2.0 |
| Transparency | 80 | 71 |
| Dart impact (grams), after ageing at room temperature: | | |
| (1) 24 hours | 38 | 35 |
| (2) 6 weeks | 35 | 19 |
| (3) 3 months | 36 | 13 |
| (4) 6 months | 30 | <5 |

The improved optical properties and lack of embrittlement of film made from polypropylene of our invention are a result of the outstanding flow properties of our polymer and the differences in crystallinity attained under normal conditions.

The flow properties of polypropylenes of this invention are superior to those of prior art polypropylenes as shown by the following data. Polypropylenes of this invention and prior art polypropylenes of the same molecular weights were subjected to various sheer stresses in an extrusion plastometer and the rate of flow measured as shown in FIGURE 1.

At low sheer stresses the rates of flow are approximately equivalent; however, as the sheer stresses are increased and approach those encountered in commercial molding equipment, the rate of flow of the polypropylene of this invention is about 60 percent greater than the rate of flow of prior art polypropylenes.

Under normal conditions the polypropylenes of this invention crystallize at a slower rate and have a lower order of crystallinity than prior art polypropylenes because of the differences in structure. This can be seen by comparing the melting points and crystallization temperatures of the polypropylenes of this invention with prior art polypropylenes. The following data was obtained on a differential scanning calorimeter (DSC). The samples were heated and cooled at a rate of 10° C./minute.

|  | Melting Point, °C. (Tm) | Crystallization Temperature, °C. |
| --- | --- | --- |
| Polypropylene—this invention | 158 | 104 |
| Prior art polypropylenes | 161 | 110 |

The lower crystallization temperature and lower melting point of our polypropylene indicate a slower crystallization process and a lower order of crystallinity, respectively, under normal conditions. The crystallinity of our polypropylene can be increased by forcing the crystallization under controlled conditions, such as annealing at or near the melting point for long periods of time. However, under normal conditions our polypropylene will not attain the same degree of crystallinity as prior are polypropylenes. Therefore, film produced from our polypropylene retains its impact strength upon ageing, whereas film produced from prior art polypropylenes embrittles with age because of its higher order of crystallinity.

Examples 1 and 2 illustrate the preparation of propylene polymers within the scope of our invention.

Example 1

A catalyst mixture was prepared by suspending 0.59 gram (0.0155 mole) of lithium aluminum hydride and 2.41 grams (0.0155 mole) of titanium trichloride in 110 ml. of sweet mineral spirits. The mixture was activated by heating to 100° C. in an inert atmosphere and stirring for 1 hour with a high-speed stirrer. The activated catalyst mixture was charged to a 600-ml. rocking autoclave under a blanket of nitrogen. The autoclave was sealed and 300 ml. of liquid propylene was added at room temperature. The autoclave was heated to 150° C. and agitated at this temperature for 4 hours. The autoclave was then cooled, and the crude reaction product was stirred with 1000 ml. of methanol and filtered. The crude polypropylene was washed free of catalyst residues by repeated extraction with hot methanol and then dried. The purified polypropylene weighed 217 grams. Properties were as follows:

| | |
|---|---|
| Melt index | 13.6 |
| Density | 0.914 |
| Crystallinity, percent | 70 |
| Ash, percent | 0.14 |
| Inherent viscosity | 0.73 |
| Percent unsaturation: | |
| Vinyl | 0.047 |
| Vinylidene | 0.036 |
| Total | 0.083 |

Example 2

An 82-gallon autoclave was charged with 40 gallons of odorless naphtha and 50 grams of lithium aluminum hydride-titanium trichloride catalyst complex. The catalyst complex was prepared by mixing lithium aluminum hydride and titanium trichloride in a 1 to 1 mole ratio in odorless naphtha at 30° C. for 2 hours. After trituration of the mixture was complete, the catalyst mixture was elutriated until the purple color of unreacted titanium trichloride was no longer visible in the overflow solvent. Fifty grams of the remaining catalyst mixture was charged to the autoclave. Propylene was pressured in at 400 pounds and 150° C. for a reaction time of 8 hours. The polymer solution in the autoclave was then filtered through a plate and frame filter at 200° C. and 400 p.s.i. The clear colorless polypropylene dope was let down from 400 pounds pressure at the filter discharge to a stirred concentrating vessel. The concentrating vessel was maintained at 200° C. while sweeping gaseous propylene heated to 200° C. through the polymer dope. In this manner all of the solvent was removed from the polypropylene and the molten polypropylene was extruded through a cutter face and chopped in water to give pellets of polypropylene. The yield of polymer was 69 pounds with a specific gravity of 0.910, and crystallinity of 92 percent. The reaction rate in the above run is equal to 78 grams of polymer per gram of catalyst per hour and the yield of polymer is approximately 625 pounds per pound of catalyst or 3100 pounds per pound of lithium aluminum hydride. Unsaturation content of the polypropylene was 0.045 percent vinyl and 0.030 percent vinylidene.

In Example 3 polypropylene is prepared according to the prior art and the properties of this polymer should be compared with our product of Example 4.

Example 3

A solution of 1.8 grams of titanium tetrachloride in 50 ml. of sweet mineral spirits is added dropwise at a temperature of 5–10° C. to a solution of 11.4 grams of triethyl aluminum in 150 ml. of sweet mineral spirits. The solution is further diluted to 500 ml. with sweet mineral spirits and charged to a 2-liter stirred autoclave under a blanket of nitrogen. The autoclave was sealed and 190 grams of liquid propylene was added at room temperature. The autoclave was heated to 55–60° C. and agitated at this temperature. After the pressure has fallen from the initial value of about 10 atmospheres to about 2 atmospheres, an additional 160 grams of propylene are added, and the polymerization is continued for 20 hours.

The residual gases are then vented, and 95 grams of methanol are pumped into the autoclave. The crude polymerization product is then extracted from the autoclave and filtered. The crude polypropylene was washed free of catalyst residues by repeated extraction with hot methanol and then dried. The polypropylene thus obtained weighed 175 grams and had an ash content of 0.18 percent. This polypropylene was then extracted with boiling n-heptane in a Soxhlet-type extractor. The n-heptane-insoluble portion amounting to 35 percent of the total polymer had an inherent viscosity of 2.9 and unsaturation as follows:

| | Unsaturation, percent |
|---|---|
| Vinyl | 0.004 |
| Vinylidene | 0.003 |
| Total | 0.007 |

Example 4

A catalyst mixture was prepared by suspending 0.60 gram of lithium aluminum hydride, 2.40 grams of titanium trichloride, and 0.66 gram of sodium fluoride in 100 ml. of sweet mineral spirits. The mixture was diluted with 900 ml. of sweet mineral spirits and charged to a 2-liter stirred autoclave under a blanket of nitrogen. The autoclave was heated to 150° C. and propylene was pumped in to maintain a pressure of 1000 p.s.i. The polymerization was conducted at these conditions for 4 hours. The autoclave was then cooled and the crude reaction product was stirred with 1000 ml. of methanol and filtered. The crude polypropylene was washed free of catalyst residues by repeated extraction with hot methanol and then dried. The polypropylene thus obtained weighed 291 grams and had an ash content of 0.15 percent. This polypropylene was then extracted with boiling hexane in a Soxhlet-type extractor. The hexane-insoluble portion amounting to 75 percent of the total polymer had an inherent viscosity of 1.7 and unsaturation as follows:

| | Unsaturation, percent |
|---|---|
| Vinyl | 0.043 |
| Vinylidene | 0.032 |
| Total | 0.072 |

The hexane-insoluble portion was then extracted with boiling n-heptane. The heptane-insoluble portion amounting to 69 percent of the total polymer had an inherent viscosity of 1.7 and unsaturation as follows:

| | Unsaturation, percent |
|---|---|
| Vinyl | 0.035 |
| Vinylidene | 0.030 |
| Total | 0.065 |

Physical properties were determined on polypropylenes prepared by the methods described in Examples 3 and 4. Results are as follows:

| | Prior Art | This Invention | |
|---|---|---|---|
| | Example 3 Heptane Insoluble | Example 4 Hexane Insoluble | Example 4 Heptane Insoluble |
| Inherent viscosity (in tetralin) | 1.6 | 1.7 | 1.7 |
| Density | 0.913 | 0.908 | 0.909 |
| Tensile strength: | | | |
| At fracture, p.s.i. | 2,850 | 3,735 | 3,820 |
| At yield, p.s.i. | 4,780 | 4,330 | 4,420 |
| Elongation, percent | 190 | 83 | 110 |
| Stiffness in flexure, p.s.i. | 166,000 | 139,000 | 139,000 |
| Vicat softening point, ° C. | 150 | 139 | 140 |
| Hardness, Rockwell R | 95 | 93 | 93 |

The above properties indicate the lower degree of crystallization attained by the polypropylenes of this invention under normal conditions as indicated by the lower density, tensile strength, stiffness, and softening point of our polypropylene when compared with prior art polypropylenes.

The inherent viscosity of the polypropylenes of our invention can be varied over rather wide limits. For instance, the total polymer can be varied in inherent viscosity over the range 0.3 to 4.0 with the hexane-soluble portion having an inherent viscosity of 0.1 to 0.6 and the hexane-insoluble portion having an inherent viscosity of 0.5 to 5.0.

Throughout the specification and claims the polymer unsaturation that is referred to is measured by infrared spectroscopy. One of the most widely used methods of detecting carbon-carbon double bonds and of differentiating the various types of unsaturation is through a study of the out-of-plane deformation of the attached hydrogen atoms. Infrared absorptions at 11.0 microns due to —CHCH$_2$ and at 11.25 microns due to —CRCH$_2$ are used in this determination. An absorption band of 11.15 microns due to crystalline polypropylene interferes in the accurate measurement of the absorption bands due to vinyl and vinylidene unsaturation. A differential technique is used cancelling out the interfering absorption band, and a variable thickness reference sample was used.

A sample of polypropylene was hydrogenated under such conditions as to produce a polymer which, for analytical purposes, was completely saturated. The powdered polymer was placed in a specially prepared wedge-shaped die and heated to 180° C. at 3000 p.s.i. After 10 minutes at this temperature and pressure the die containing the polymer was cooled by a water quench. The molded specimen is a strip 5 inches long by 1½ inches wide. It is wedge shaped along the thickness dimension varying from 0.01 cm. at one end to 0.05 cm. at the other, and it is referred to as the standard wedge.

A 0.3 gram sample of polypropylene is compression molded at 180° C. and 3000 p.s.i. pressure. After 10 minutes at this temperature and pressure, the die is cooled in water and the sample is removed. Its thickness is measured to ±0.0002 cm.

The molded sample is placed in the sample beam of the infrared instrument and the standard wedge in the reference beam. The instrument is set at 8.9 microns and to record at 3 minutes per micron to 9.75 microns. If absorption peaks are apparent in the spectrum at 9.07 and 9.58 microns, the thickness of the portion of the standard wedge in the reference light path is increased by moving the wedge horizontally. If negative (downscale) peaks are observed, the thickness is decreased. When 100 percent compensation is achieved a straight line from 8.9 to 9.75 microns is recorded and the crystallinity of the sample and the standard wedge as seen by the instrument is identical.

To determine the vinyl and vinylidene unsaturation absorption the infrared instrument is set to 10.75 microns, and to record at 3 minutes per micron to 11.5 microns. A base line is drawn from 10.75 microns to 11.50 microns, and the net (base line) absorption at 11.00 and 11.25 microns is determined.

The unsaturation is calculated by the following equations:

Percent vinyl C=C
$$= \frac{\text{Net absorption at 11.00 microns}}{\text{Sample thickness (cm.)}} \times 0.0193$$

Percent vinylidene C=C
$$= \frac{\text{Net absorption at 11.25 microns}}{\text{Sample thickness (cm.)}} \times 0.0231$$

Although the invention has been described in considerable detail with particular reference to certain preferred embodiments thereof, it will be understood that variations and modifications can be effected within the spirit and scope of the invention as described hereinabove, and as defined in the appended claims.

We claim:
1. As a composition of matter, a crystalline propylene homopolymer insoluble in boiling hexane, said propylene homopolymer having both vinyl and vinylidene unsaturation, the total vinyl and vinylidene unsaturation being between 0.04 and 0.27 weight percent and said vinyl unsaturation being 0.025 to 0.065 weight percent.

2. As a composition of matter, a crystalline propylene homopolymer insoluble in boiling hexane and having both vinyl and vinylidene unsaturation, said homopolymer having a crystallinity as determined by extraction with boiling n-heptane of at least 70 percent by weight, the total vinyl and vinylidene unsaturation being between 0.04 and 0.27 weight percent, said vinyl unsaturation between 0.025 to 0.085 weight percent.

3. Molded article prepared from the composition of claim 1.

4. Molded article prepared from the composition of claim 2.

5. Film prepared from the composition of claim 1.
6. Film prepared from the composition of claim 2.
7. Fibers and filaments prepared from the composition of claim 1.
8. Fibers and filaments prepared from the composition of claim 2.

References Cited

UNITED STATES PATENTS

| | | | |
|---|---|---|---|
| 3,189,584 | 6/1965 | Shearer | 260—94.9 |
| 2,825,721 | 3/1958 | Hogan et al. | 260—94.9 |
| 3,050,471 | 8/1962 | Anderson et al. | 260—93.7 |
| 2,909,511 | 10/1959 | Thomas | 260—93.7 |
| 2,886,561 | 5/1959 | Reynolds et al. | 260—94.9 |

FOREIGN PATENTS

| | | |
|---|---|---|
| 555,890 | 9/1957 | Belgium. |
| 1,248,850 | 11/1960 | France. |

JOSEPH L. SCHOFER, *Primary Examiner.*

M. B. KURTZMAN, *Assistant Examiner.*